United States Patent
Hwang

[19]

[11] Patent Number: 5,818,416
[45] Date of Patent: Oct. 6, 1998

[54] IMAGE SIZE ADJUSTING APPARATUS FOR A DIGITAL DISPLAY MONITOR

[75] Inventor: Ho-Dae Hwang, Seoul, Rep. of Korea

[73] Assignee: SamSung Electronics Co., Ltd., Suwon, Rep. of Korea

[21] Appl. No.: 887,128

[22] Filed: Jul. 2, 1997

[30] Foreign Application Priority Data

Jul. 2, 1996 [KR] Rep. of Korea ............... 1996-26718

[51] Int. Cl.$^6$ ..................................................... G09G 5/00
[52] U.S. Cl. .......................................... 345/127; 348/581
[58] Field of Search .............................. 345/99, 127, 129, 345/130, 131, 132, 342, 202; 348/704, 581, 582

[56] References Cited

U.S. PATENT DOCUMENTS

| | | | |
|---|---|---|---|
| 4,916,747 | 4/1990 | Arimoto | 382/47 |
| 5,068,731 | 11/1991 | Takeuchi | 348/581 |
| 5,406,308 | 4/1995 | Shiki | 345/127 |
| 5,422,678 | 6/1995 | Takeuchi | 348/581 |
| 5,457,473 | 10/1995 | Arai et al. | 345/10 |
| 5,532,716 | 7/1996 | Sano | 345/132 |
| 5,555,027 | 9/1996 | Takeuchi | 348/581 |

*Primary Examiner*—Matthew Luu
*Attorney, Agent, or Firm*—Robert E. Bushnell, Esq.

[57] ABSTRACT

An image size adjusting apparatus for a digital display monitor using a liquid crystal display (LCD) panel includes a frequency multiplier circuit having a programmable divider, and six line memories in which two line memories are designated per each color picture signal line. The adjustment of the horizontal size of the display image can be achieved by changing the amount of sampling data in cooperation with the PLL circuit and the programmable divider. Also, adjustment of the vertical size can be achieved by changing the number of scanning lines such that double scanning is performed during one period of the horizontal synchronization signals, using the line memories. Thus, the apparatus provides for a simplification of adjusting operations of the horizontal and vertical image size of a digital display monitor.

13 Claims, 5 Drawing Sheets

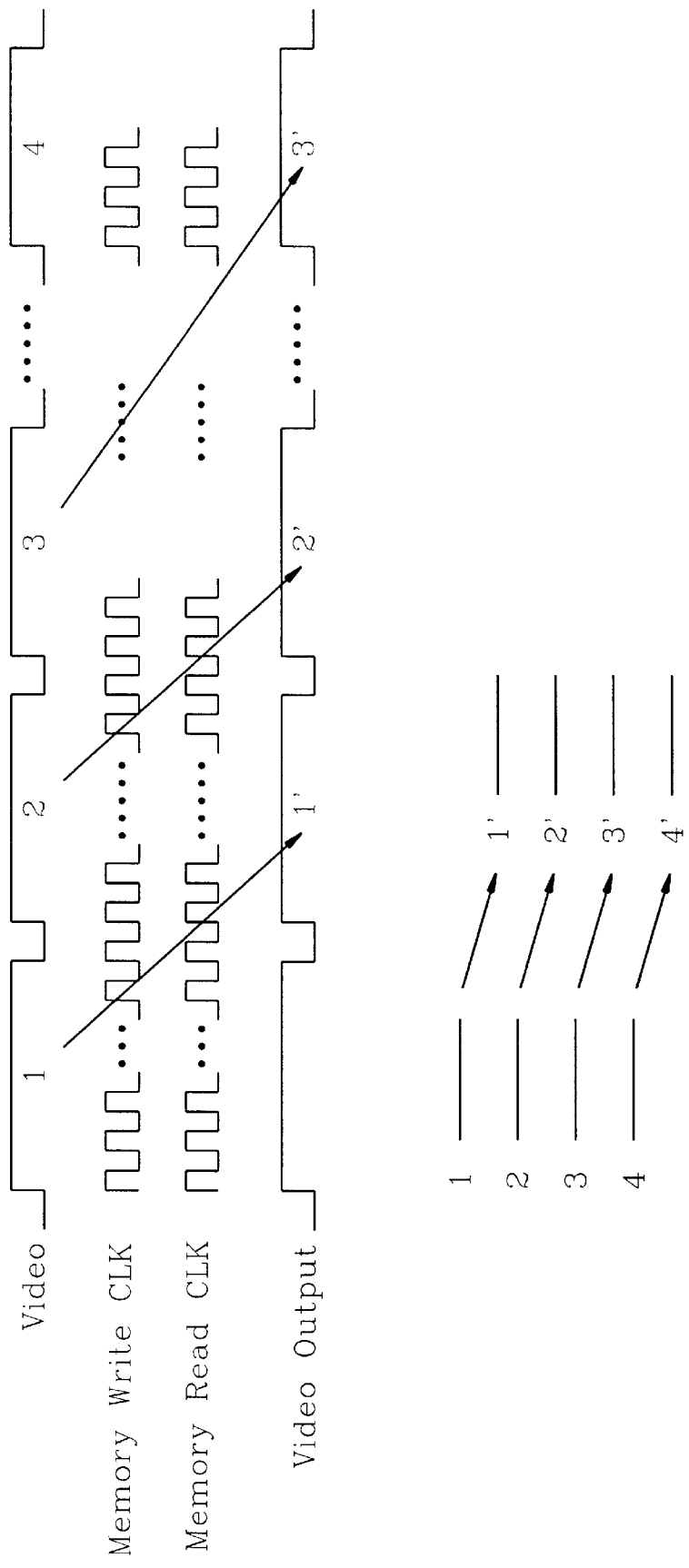

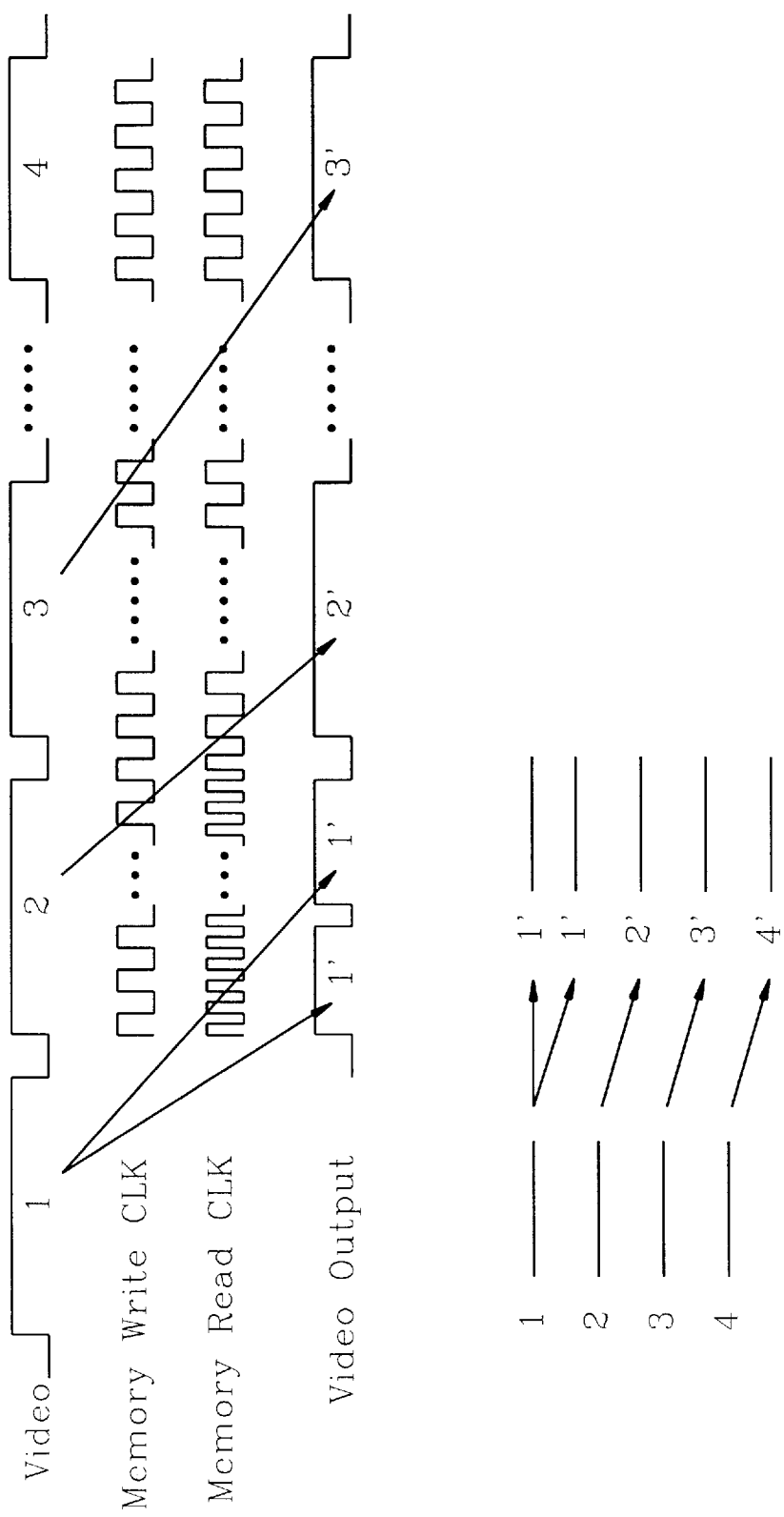

IMAGE SIZE ADJUSTING APPARATUS FOR A DIGITAL DISPLAY MONITOR

CLAIM OF PRIORITY

This application makes reference to, incorporates the same herein, and claims all benefits accruing under 35 U.S.C. § 119 from an application for IMAGE SIZE ADJUSTING APPARATUS OF DIGITAL DISPLAY MONITORS earlier filed in the Korean Industrial Property Office on the 2nd day of Jul. 1996 and there duly assigned Ser. No. 26718/1996, a copy of which application is annexed hereto.

BACKGROUND OF THE INVENTION

1. Field of the Invention

The present invention relates to display monitors, and more particularly to an image size adjusting apparatus for a digital display monitor using a liquid crystal display (LCD) panel.

2. Description of the Related Art

In the conventional display monitors using a cathode ray tube, the adjustment of the horizontal size and vertical size of the display image has been performed by the deflection control that controls the amount of currents flowing through the horizontal and vertical deflection yokes provided around the neck of the CRT.

However, as for the digital monitors adopting an LCD panel and driven by the digital video signals, the display image size adjustment through the conventional method is impossible. Thus, in order to adjust the size of the image in the digital monitor, it is necessary to process the digital video signals through a digital data conversion.

The following patents each disclose features in common with the present invention but do not disclose the specifically recited image size adjusting apparatus of the present invention: U.S. Pat. No. 5,457,473 to Arai et al., entitled Image Display Apparatus, U.S. Pat. No. 5,532,716 to Sano, entitled Resolution Conversion System, U.S. Pat. No. 5,555,027 to Takeuchi, entitled Video Processor For Enlarging And Contracting An Image In A Vertical Direction, U.S. Pat. No. 5,422,678 to Takeuchi, entitled Video Processor For Enlarging And contracting An Image In A Vertical Direction, and U.S. Pat. No. 4,916,747 to Arimoto, entitled Image Processing System.

SUMMARY OF THE INVENTION

It is therefore the object of the invention to provide an image size adjusting apparatus for a digital display monitor that can easily adjust the horizontal and vertical size of the display image.

In accordance with the present invention, an image size adjusting apparatus is provided comprising: an input terminal for receiving the analog color picture signals; a frequency multiplier for receiving a first frequency of the horizontal synchronization signal of the analog color picture signals and for producing a first clock signal of a second frequency corresponding to the data value of the horizontal size control signal supplied by a micro-controller which controls the digital monitor and a second clock signal of a third frequency corresponding to the division of the first frequency, in which said second frequency is higher than said first frequency, and said third frequency is higher than said first frequency but is lower than said second frequency; an analog-to-digital converter for converting the analog color picture signals fed from the input terminals into a digital color picture signals in synchronism with the second clock signal; a selector means for selectively outputting one of the first clock signal and the second clock signal in response to the data value of the vertical size control signal supplied by the micro-controller; a timing circuit which generates a select control signal corresponding to the data value of the vertical size control signal in synchronism with the clock signal supplied by the frequency multiplier; a line memory having a first and second memory regions, each memory region being placed in a write enable state in response to the second clock signal and being placed in a read enable state in response to the output signal of the selector means; output terminals for outputting the digital color picture signal data read out from the line memory; a first switching means for selectively transferring the converted digital color picture signals to one of the first and second memory regions in response to the horizontal synchronization signal; and a second switching means for selectively transferring the readout data from one of the first and second memory regions to the output terminals in response to the select control signal of the timing circuit.

The adjustment of the horizontal size is achieved by changing the amounts of sampling data in cooperation with the PLL circuit and the programmable divider. Also, the adjustment of the vertical size is achieved by changing the number of scanning lines such that double scanning is performed during one period of the horizontal synchronization signals, using the two line memories in a color picture signal channel. With this, the apparatus of the invention provides for a simplification of adjusting operations of the horizontal and vertical image size of digital display monitors.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a timing diagram showing digital data conversion when the vertical size conversion of the display image is not performed in the image size adjusting apparatus of FIG. 1, and showing the numbers of input lines and output lines of the color picture signals; and FIG. 5 is a view similar to FIG. 4 showing digital data conversion when the vertical size conversion of the display image is performed in the image size adjusting apparatus of FIG. 1, and showing the numbers of input lines and output lines of the color picture signals.

DETAILED DESCRIPTION OF PREFERRED EMBODIMENTS

Figure 1:
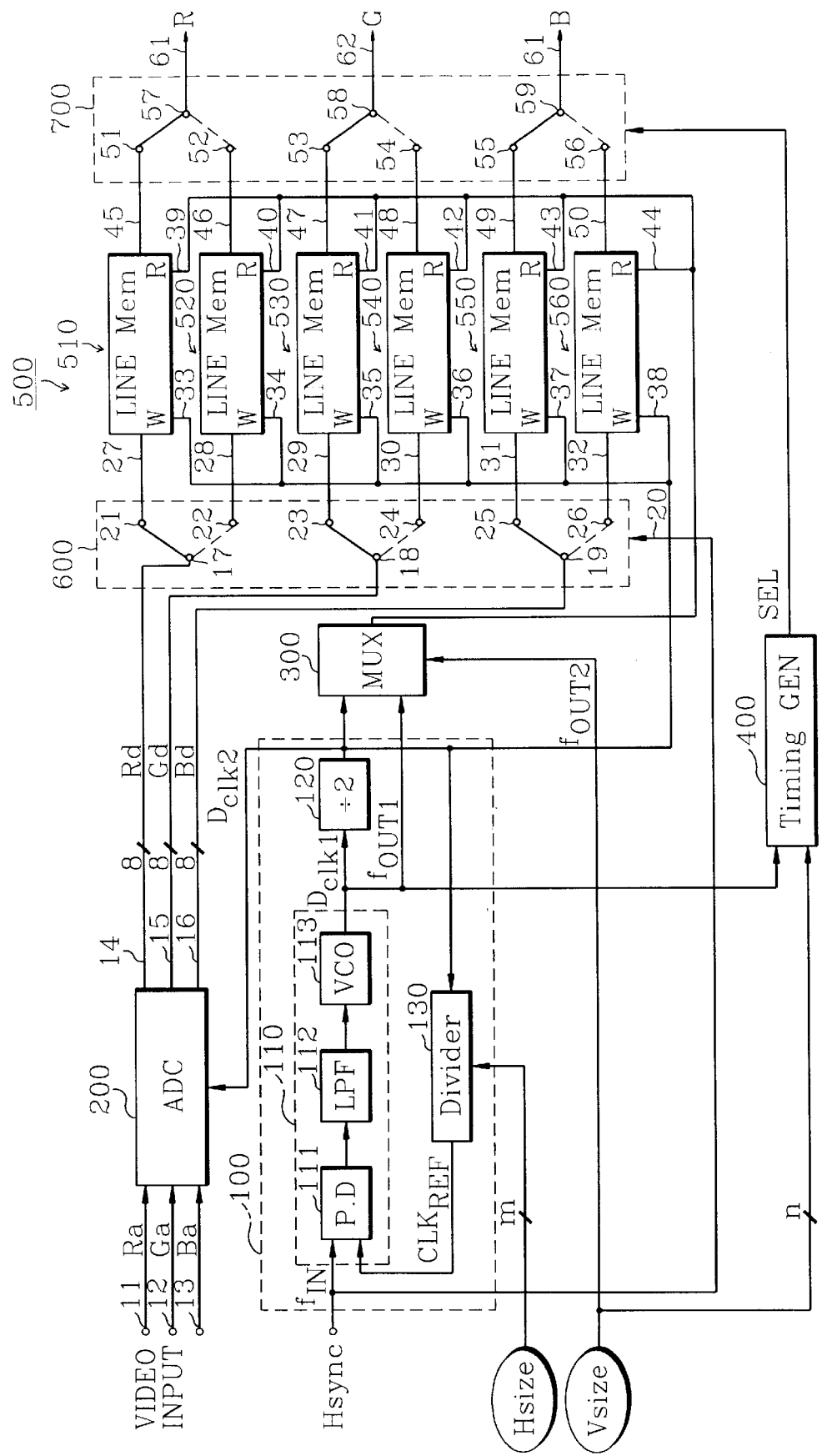
FIG. 1 is a block diagram of an image size adjusting apparatus for the digital display monitor in accordance with an embodiment of the present invention.

Referring to FIG. 1, there is shown an image size adjusting apparatus of a digital display monitor in accordance with the present invention. In FIG. 1, the digital display monitor has video input terminals, i.e., inputs for the analog color picture signals Ra, Ga, and Ba, and the horizontal synchronizing signal Hsync. Also, an analog-to-digital (A/D) converter 200 is provided for converting the analog picture signal inputs into respective digital data. The image size adjusting apparatus according to the invention comprises a frequency multiplier 100 having a phase locked loop 110 and a programmable divider 130, and a memory section 500 having a plurality of line memories 510–560 designated to the digital color picture signal lines Rd, Gd, and Bd fed from the outputs of the A/D converter 200.

In this embodiment, the horizontal size of the image is adjusted by changing the sampling frequency of the A/D converter 200 with the aid of the frequency multiplier 100, and the vertical size of the image is adjusted by performing double scanning during the corresponding line scanning period.

Returning to FIG. 1, the frequency multiplier 100 comprises a phase locked loop (PLL) 110, a one half divider 120 for dividing the input frequency $f_{out1}$ of the signal Dclk1 outputted from the PLL 110 by two in order to produce an output signal Dclk2 having a frequency $f_{out2}$, and a programmable divider 130 for dividing the input frequency $f_{out2}$ of the signal Dclk2 outputted from the one half divider 120 by n in order to produce an output signal $CLK_{REF}$ having a frequency $F_{REF}$. The dividing magnification rate n is determined by the data value of the m-bit data signal $H_{SIZE}$ that represents the horizontal size of the input image. Also, the data signal $H_{SIZE}$ is supplied from the micro-controller (not shown) which controls the digital monitor system.

The PLL 110 comprises a phase detector (PD) or phase comparator 111, a low pass filter (LPF) 112, and a voltage controlled oscillator (Vco) 113. Inputs of the phase detector 111 are supplied with the horizontal synchronizing signal Hsync and the output signal $CLK_{REF}$ of the programmable divider 130. The PLL 110 forms a feedback loop with two dividers 120 and 130. The PLL 110 compares the input frequency $f_{IN}$ of the horizontal synchronizing signal Hsync received in the capture range with that of the output signal $CLK_{REF}$ of the programmable divider 130, and holds the output frequency $f_{out1}$ thereof on $f_{IN}* 2* N$ (where N is data value of the data signal $H_{SIZE}$.)

The external video input terminals 11,12, and 13 are connected to the input terminals of the A/D converter 200, and through which the analog color picture signals Ra, Ga, and Ba are supplied. The analog color picture signals Ra, Ga, and Ba are converted into the digital color picture signals Rd, Gd, and Bd, respectively, in synchronism with the input signal Dclk2 fed from the one half divider 120. The digital color picture signals Rd, Gd, and Bd are produced at the output terminals 14, 15, and 16 of the A/D converter 200 and the output terminals 14, 15, and 16 are connected to the input ports 17, 18, and 19 of a switching circuit 600, respectively.

The switching circuit 600 can be comprised of 24 1*2 demultiplexers when each color picture signal has 8-bit signal. Control input of each demultiplexer, i.e., the control input 20 of the switching circuit 600 is supplied by the horizontal synchronizing signal Hsync. The output ports 21~26 of the switching circuit 600 are connected to the input ports 27~32 of six line memories 510~560 which constitute memory section 500. The write enable ports 33~38 of the line memories 510~560 are commonly connected to the output of the one half divider 120. The read enable ports 39~44 of the line memories 510~560 are commonly connected to the output of a 2* 1 multiplexer 300.

For example, when the horizontal synchronizing signal Hsync is at a high level, the digital color picture signals Rd, Gd, and Bd outputted from the A/D converter 200 are transferred to the first part of the memory section 500, i.e., line memories 510, 530, and 550, respectively, by the operation of the switching circuit 600. Also, when the horizontal synchronizing signal Hsync is at a low level the digital color picture signals Rd, Gd, and Bd are transferred to the second part of the memory section 500, i.e., line memories 520, 540, and 560, respectively.

Figure 2A:
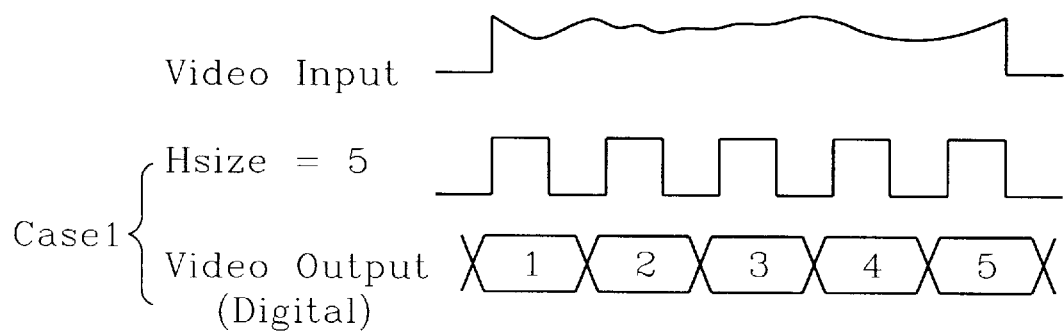
FIG. 2A and FIG. 2B are a schematic diagrams showing the sampling frequency and the number of pixels, respectively, in the case where the value of the horizontal size control signal is set to five in the image size adjusting apparatus shown in FIG. 1.
Figure 2B:
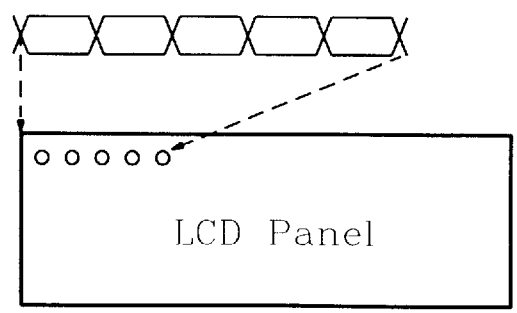

FIG. 2A and FIG. 2B schematically show the sampling frequency and the number of pixels, respectively when the data value of the horizontal size control signal $H_{SIZE}$ is set to five in the image size adjusting apparatus shown in FIG. 1. Further, FIG. 3A and FIG. 3B schematically show the sampling frequency and the number of pixels, respectively when the data value of the horizontal size control signal $H_{SIZE}$ is set to ten at the image size adjusting apparatus shown in FIG. 1.

Figure 3A:
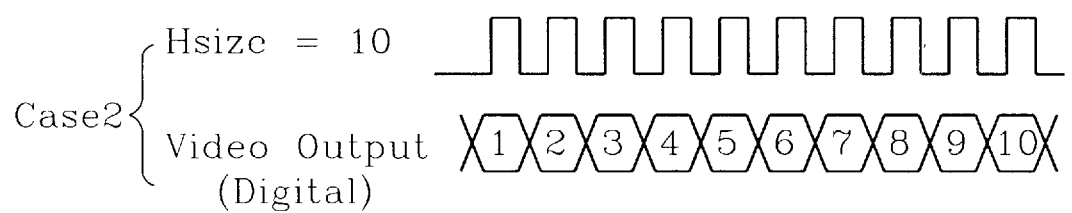
FIG. 3A and FIG. 3B are views similar to FIGS. 2A and 2B showing the sampling frequency and the number of pixels, respectively, in another case where the value of the horizontal size control signal is set to ten in the apparatus shown in FIG. 1.
Figure 3B:
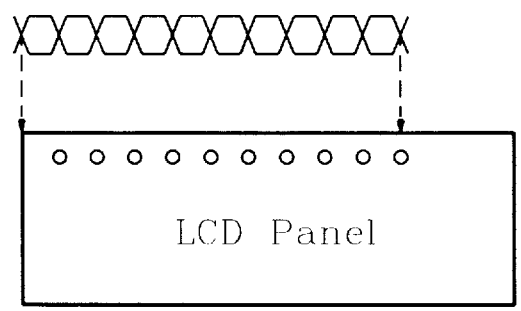

First, when comparing FIG. 3A with FIG. 2A, during a period of the horizontal synchronizing signal Hsync, it can be found that the sampling frequency (i.e., output frequency of the one half divider 120) when the horizontal size control signal data is set to ten are two times as many as that is set to five. Thus, by changing the data value of the horizontal size control signal $H_{SIZE}$, it is possible to adjust the horizontal size of the display image.

In the meantime, the image size adjusting apparatus of FIG. 1 includes a timing circuit 400 which generates a select control signal SEL corresponding to the data value of the vertical size control signal $V_{SIZE}$ supplied from the aforementioned system micro-controller (not shown) in synchronism with the clock signal Dclk1 supplied by the PLL 110. This select control signal SEL is provided to another switching circuit 700 which will be described later.

Similar to the switching circuit 600, the another switching circuit 700 can be comprised of 24 2* 1 multiplexers when each of the color picture signals has 8-bit data. The input ports 51~56 of the switching circuit 700 are connected to the output ports 45~50 of the line memories 510~560. A control input of each multiplexer, i.e., the control input of the switching circuit 700 is supplied by the select control signal SEL fed from the timing generator 400. The output ports 58~60 of the switching circuit 700 are directed to the picture signal output ports 61~63 of the image size adjusting apparatus shown in FIG. 1. For example, when the select control signal SEL is at a high level, the read out data of the first part of the memory section 500, i.e., data of line memories 510, 530, and 550 are transferred to the signal output ports 61~63, respectively, by the operation of the switching circuit 700. Also, when the select control signal SEL is at a low level, the read out data of the second part of the memory section 500, i.e., data of line memories 520, 540, and 560 are transferred to the signal output ports 61~63, respectively.

In FIG. 4, there is shown a timing diagram of the input/output signal data when the vertical size conversion of the display image is not performed by the image size adjusting apparatus of the invention, that is when the data value of the vertical size control signal $V_{SIZE}$ is zero. Also, at lower part of the drawing, there is shown numbers of input lines and output lines of the color picture signals. When the vertical size conversion of the display image is not performed in the image size adjusting circuit of FIG. 1, the 2*1 multiplexer 300 selects the output signal Dclk2 of the one half divider 120. Thus, as shown in FIG. 4, the frequencies of the write clock signal and read clock signal become equal and there is no increase in line numbers.

FIG. 5 is a similar timing diagram as FIG. 4, when the vertical size conversion of the display image is performed in the image size adjusting apparatus. For example, in FIG. 5, the data value of the vertical size control signal $V_{SIZE}$ is set to one, and the variation in numbers of input lines and the corresponding output lines of the color picture signals can be seen.

When the vertical size conversion of the display image is performed, the 2*1 multiplexer 300 selects the output signal Dclk1 of the PLL 110 by the data value 1 of the vertical size control signal $V_{SIZE}$. Thus, as shown in FIG. 5, the frequency of the first memory read clock signal is twice that of the write clock signal, and the double scanning of the first line is occurring. In other words, the write data in the first line memory is read out twice during one period of the horizontal synchronization signals. Further, if the data value of the vertical size control signal $V_{SIZE}$ is set to two, the double scanning for the respective first and second line is performed. Also, if the data value of the vertical size control signal $V_{SIZE}$ is set to three, the double scanning for the first, second, and third line is performed. In this manner, according to the input data value of the vertical size control signal $V_{SIZE}$, adjusting the vertical size of the display image is possible.

As apparent from foregoing, adjusting the horizontal size of the display image can be achieved by changing the amount of sampling data in cooperation with the PLL circuit and the programmable divider. Also, adjustment of the vertical size can be achieved by changing the number of scanning lines such that double scanning is performed during one period of the horizontal synchronization signals, using the two line memory in a video signal channel. Thus, the apparatus of the invention provides for a simplification of adjusting operations of the horizontal and vertical image size of digital display monitors.

While the invention has been described in terms of an exemplary embodiment, it is contemplated that it may be practiced as outlined above with modifications within the spirit and scope of the appended claims.

What is claimed is:

1. An image size adjusting apparatus for a digital display monitor, comprising:

input terminals for receiving analog color picture signals;

a frequency multiplier for receiving a first frequency $f_{IN}$ of a horizontal synchronization signal of the analog color picture signals and for producing a first clock signal Dclk1 of a second frequency $f_{out1}$ corresponding to a data value of a horizontal size control signal $H_{SIZE}$ supplied by a micro-controller which controls the digital monitor and a second clock signal Dclk2 of a third frequency $f_{out2}$ corresponding to the division of the second frequency $f_{OUT1}$ wherein said second frequency is higher than said first frequency, and said third frequency is higher than said first frequency but is lower than said second frequency;

an analog-to-digital converter for converting the analog color picture signals fed from the input terminals into digital color picture signals in synchronism with the second clock signal Dclk2;

a selector means for selectively outputting one of the first clock signal Dclk1 and the second clock signal Dclk2 in response to a data value of the vertical size control signal $V_{SIZE}$ supplied by the micro-controller;

a timing circuit for generating a select control signal SEL corresponding to the data value of the vertical size control signal $V_{SIZE}$ in synchronism with the clock signal Dclk1 supplied by the frequency multiplier;

a line memory having a first and second memory regions, each memory region being placed in a write enable state in response to the second clock signal Dclk2 and being placed in a read enable state in response to the output signal of the selector means;

output terminals for outputting the digital color picture signal data read out from the line memory;

a first switching means for selectively transferring the digital color picture signals to one of the first and second memory regions in response to the horizontal synchronization signal; and a second switching means for selectively transferring the digital color picture signals read from one of the first and second memory regions to the output terminals in response to the select control signal SEL of the timing circuit.

2. The image size adjusting apparatus as claimed in claim 1, the frequency multiplier comprising: a phase locked loop (PLL) for receiving the first frequency $f_{IN}$ of the horizontal synchronization signal and a fourth frequency $f_{REF}$ of a feedback signal, and for comparing the first frequency $f_{IN}$ with the fourth frequency $f_{REF}$ to produce the first clock signal Dclk1 of the second frequency which is locked to the first frequency; a first divider for dividing the second frequency $f_{out1}$ of the first clock signal Dclk1 by a predetermined magnification rate in order to produce the second clock signal Dclk2 having the third frequency $f_{out2}$; and a second divider for dividing the third frequency $f_{out2}$ of the second clock signal Dclk2 fed from the first divider by a magnification rate corresponding to the data value of the vertical size control signal $V_{SIZE}$ in order to produce the feedback signal $CLK_{REF}$ of the fourth frequency $f_{REF}$ to be supplied by the PLL.

3. The image size adjusting apparatus as claimed in claim 2, the magnification rate of the first divider being set to one-half.

4. The image size adjusting apparatus as claimed in claim 1, the selector means comprising a multiplexer having two input terminals for receiving the first clock signal Dclk1 and the second clock signal Dclk2, respectively, a control signal input for receiving the vertical size control signal $V_{SIZE}$, and an output terminal connected to read enable ports of the line memory.

5. The image size adjusting apparatus as claimed in claim 1, the first switching means comprising a plurality of demultiplexers having input ports for receiving the digital color picture signals from the analog-to-digital converter, a control input for receiving the horizontal synchronization signal, a first output port for connecting to a data input port of the first memory region of the line memory, and a second output port for connecting to a data input port of the second memory region of the line memory.

6. The image size adjusting apparatus as claimed in claim 1, the second switching means comprising a plurality of multiplexers having a first input port connected to the data output port of the first memory region, a second input port connected to the data output port of the second memory region, a control input port for receiving the select control signal of the timing circuit, and an output port connected to the output terminal of the digital color picture signals.

7. An image size adjusting apparatus for a digital display monitor, comprising:

input terminals disposed to receive color picture signals representing visual images for display on a screen of a digital monitor;

a frequency multiplier receiving a first frequency of a horizontal synchronization signal for said color picture signals and producing a first clock signal having a second frequency corresponding to a data value of a horizontal size control signal supplied by a microcontroller driving the digital monitor and a second clock signal of a third frequency corresponding to the division of the second frequency, with said second frequency being higher than said first frequency, and said third frequency being higher than said first frequency but lower than said second frequency;

a converter synchronizing said color picture signals with the second clock signal;

a selector selectively generating a selection signal comprising one of the first clock signal and second clock signal in dependence upon a data value indicated by a vertical size control signal supplied by the microcontroller;

a timing circuit generating a select control signal corresponding to the data value of the vertical size control signal in synchronism with said first clock signal;

a line memory having a first and second memory regions, with each of said memory regions being in a write enable state accommodating storage of said color picture signals as picture data in response to said second clock signal and being in a read enable state accommodating reading of said picture data in response to said selection signal generated by said selector;

output terminals disposed to conduct said picture data read from said line memory;

a first switch selectively transferring said color picture signals to one of said first and second memory regions in response to the horizontal synchronization signal; and a second switch selectively transferring said picture data from one of the first and second memory regions to said output terminals in response to said selective control signal.

8. The image size adjusting apparatus of claim 7, with said frequency multiplier comprising:

a phase locked loop receiving the first frequency of the horizontal synchronization signal and a fourth frequency of a feedback signal, and comparing the first frequency with the fourth frequency to produce the first clock signal at the second frequency which is locked to the first frequency;

a first divider dividing the second frequency of the first clock signal by a predetermined magnification rate in order to produce the second clock signal at the third frequency; and a second divider dividing the third frequency of the second clock signal fed from the first divider by a magnification rate corresponding to the data value of the vertical size control signal in order to produce the feedback signal of the fourth frequency to be supplied by said phase locked loop.

9. The image size adjusting apparatus of claim 8, with said magnification rate of the first divider being set to one-half.

10. The image size adjusting apparatus of claim 7, with said selector comprising a multiplexer having two input terminals for receiving said first clock signal and said second clock signal, respectively, a control signal input connected to receive said vertical size control signal, and an output terminal connected to read enable ports of said line memory.

11. The image size adjusting apparatus of claim 7, with said first switch comprising:

a plurality of demultiplexers each having input ports receiving said color picture signals, a control input receiving said horizontal synchronization signal, a first output port operationally connected to a data input port of said first memory region of said line memory, and a second output port operationally connected to a data input port of said second memory region of said line memory.

12. The image size adjusting apparatus of claim 7, with said second switch comprising;

a plurality of multiplexers each having a first input port connected to a data output port of said first memory region, a second input port connected to a data output port of said second memory region, a control input port receiving said select control signal, and an output port connected to a corresponding one of said output terminals.

13. The image size adjusting apparatus of claim 7, with said second switch comprising;

said first switch comprising a plurality of demultiplexers each having input ports receiving said color picture signals, a control input receiving said horizontal synchronization signal, a first output port operationally connected to a data input port of said first memory region of said line memory, and a second output port operationally connected to a data input port of said second memory region of said line memory; and said second switch comprising a plurality of multiplexers each having a first input port connected to a data output port of said first memory region, a second input port connected to a data output port of said second memory region, a control input port receiving said select control signal, and an output port connected to a corresponding one of said output terminals.

* * * * *